(12) United States Patent  
Waldorf

(10) Patent No.: US 7,667,582 B1
(45) Date of Patent: Feb. 23, 2010

(54) TOOL FOR CREATING CHARTS

(75) Inventor: Jerry A. Waldorf, Woodland Hills, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 416 days.

(21) Appl. No.: 11/251,652

(22) Filed: Oct. 14, 2005

Related U.S. Application Data

(60) Provisional application No. 60/619,111, filed on Oct. 15, 2004, provisional application No. 60/619,076, filed on Oct. 14, 2004.

(51) Int. Cl.
*G06T 11/20* (2006.01)
(52) U.S. Cl. ...................................... 340/440
(58) Field of Classification Search ................ 345/440, 345/581
See application file for complete search history.

(56) References Cited

U.S. PATENT DOCUMENTS

| | | | | | |
|---|---|---|---|---|---|
| 4,827,419 | A | * | 5/1989 | Selby, III | 701/200 |
| 5,199,439 | A | * | 4/1993 | Zimmerman et al. | 600/483 |
| 5,241,461 | A | * | 8/1993 | Georges | 700/28 |
| 5,428,776 | A | | 6/1995 | Rothfield | |
| 5,564,433 | A | * | 10/1996 | Thornton | 600/544 |
| 5,844,572 | A | * | 12/1998 | Schott | 345/440 |
| 5,850,341 | A | * | 12/1998 | Fournier et al. | 701/50 |
| 6,076,048 | A | * | 6/2000 | Gunther et al. | 702/51 |
| 6,523,022 | B1 | * | 2/2003 | Hobbs | 707/3 |
| 6,606,744 | B1 | * | 8/2003 | Mikurak | 717/174 |
| 6,611,839 | B1 | * | 8/2003 | Nwabueze | 707/101 |
| 6,658,404 | B1 | | 12/2003 | Cecchini | |
| 6,671,818 | B1 | * | 12/2003 | Mikurak | 714/4 |
| 6,700,575 | B1 | * | 3/2004 | Bovarnick et al. | 345/440 |
| 6,704,015 | B1 | * | 3/2004 | Bovarnick et al. | 345/440.2 |
| 6,959,306 | B2 | * | 10/2005 | Nwabueze | 707/104.1 |
| 6,988,249 | B1 | * | 1/2006 | Arvanitis et al. | 715/853 |
| 7,076,695 | B2 | * | 7/2006 | McGee et al. | 714/47 |
| 7,143,392 | B2 | * | 11/2006 | Ii et al. | 717/125 |
| 7,181,438 | B1 | * | 2/2007 | Szabo | 707/2 |
| 7,286,959 | B2 | * | 10/2007 | Steinke | 702/182 |
| 7,299,277 | B1 | * | 11/2007 | Moran et al. | 709/224 |
| 7,360,209 | B2 | * | 4/2008 | Gold et al. | 717/168 |
| 2002/0138472 | A1 | | 9/2002 | Ricciardi | |
| 2002/0166089 | A1 | * | 11/2002 | Noy | 714/741 |
| 2003/0056199 | A1 | * | 3/2003 | Li et al. | 717/127 |
| 2003/0079160 | A1 | * | 4/2003 | McGee et al. | 714/39 |
| 2003/0110007 | A1 | * | 6/2003 | McGee et al. | 702/179 |
| 2003/0110103 | A1 | | 6/2003 | Sesek et al. | |

(Continued)

OTHER PUBLICATIONS

Interactive analysis and display of tabular data William H. Benson, Bernard Kitous Aug. 1977 SIGGRAPH '77: Proceedings of the 4th annual conference on Computer graphics and interactive techniques Publisher: ACM.*

*Primary Examiner*—Javid A Amini
(74) *Attorney, Agent, or Firm*—Osha • Liang LLP

(57) ABSTRACT

Techniques are described for defining, creating, and presenting a chart. When the chart is called, up-to-date information is used to create the chart. This allows the chart to reflect current key performance indicators for a business. A tool can also be provided for creating a chart definition, which is used to instantiate the chart. The tool provides graphical inputs for a user to select the inputs, operations and outputs into the chart. The tool enables users to create the chart definition with little or no programming.

6 Claims, 13 Drawing Sheets

U.S. PATENT DOCUMENTS

| | | | |
|---|---|---|---|
| 2003/0164762 A1* | 9/2003 | Ridley | 340/521 |
| 2003/0227453 A1* | 12/2003 | Beier et al. | 345/419 |
| 2004/0064351 A1* | 4/2004 | Mikurak | 705/7 |
| 2004/0083453 A1* | 4/2004 | Knight et al. | 717/113 |
| 2004/0161796 A1* | 8/2004 | Gustafsson et al. | 435/7.1 |
| 2004/0214622 A1* | 10/2004 | Atkinson | 463/1 |
| 2004/0215586 A1* | 10/2004 | Koono et al. | 706/45 |
| 2005/0039170 A1* | 2/2005 | Cifra et al. | 717/125 |
| 2005/0065941 A1 | 3/2005 | DeAngelis et al. | |
| 2005/0075965 A1* | 4/2005 | Cutler | 705/37 |
| 2005/0102426 A1 | 5/2005 | Hamm et al. | |
| 2005/0154627 A1* | 7/2005 | Zuzek et al. | 705/10 |
| 2005/0256752 A1 | 11/2005 | Ramachandran et al. | |
| 2005/0288899 A1* | 12/2005 | Winstead et al. | 702/183 |
| 2006/0028471 A1* | 2/2006 | Kincaid et al. | 345/440 |
| 2006/0059253 A1* | 3/2006 | Goodman et al. | 709/223 |
| 2006/0059461 A1* | 3/2006 | Baker et al. | 717/113 |
| 2006/0130016 A1* | 6/2006 | Wagner | 717/136 |
| 2006/0178918 A1* | 8/2006 | Mikurak | 705/7 |
| 2006/0235670 A1* | 10/2006 | Vujasinovic | 703/11 |
| 2007/0038756 A1* | 2/2007 | Waldorf et al. | 709/227 |
| 2007/0179875 A1* | 8/2007 | Chiu | 705/35 |
| 2008/0288915 A1* | 11/2008 | Krablin et al. | 717/104 |

* cited by examiner

TOOL FOR CREATING CHARTS

This application claims the benefit of priority to U.S. Provisional Patent Application No. 60/619,076, filed Oct. 14, 2004, and U.S. Provisional Patent Application No. 60/619,111, filed Oct. 15, 2004. The disclosures of the prior applications are considered part of and are incorporated by reference in the disclosure of this application.

BACKGROUND

This application is related to information presentation. Computer systems and their associated applications have advanced our ability to compute and transform data and thereby provide meaningful information about data that has been accumulated. The data can be compiled into charts or graphs, including bar charts, pie charts, line graphs, tables, scatter plots and stacked bar charts. Charts provide a way to communicate the data in a graphical form that allows a user to quickly compare multiple data points to one another.

SUMMARY

In one aspect, the invention is directed to a method of creating a chart displaying key performance indicators. The method includes receiving a request for a representation of data in a chart. One or more sources for the data are determined. The data is retrieved from the one or more sources. Operations are performed on the data to obtain key performance indicator values. The key performance indicator values are displayed in the chart. Whether updated data is available is determined. If there is updated data, the chart is revised to reflect the updated data. The chart can be displayed in a Web page. The data can be retrieved from two or more databases. Displaying the key performance indicator values can provide information related to transactions within an enterprise.

In another aspect, the invention is directed to a method of creating a dynamic chart application. A selection of a data definition including one or more data fields is received from a user. A selection of one or more operators for at least one of the data fields is received from the user. The user selects the operators from a list of graphical representations of operators. A mapping between the operators and the at least one data field to a dataset is received, wherein the dataset has one or more fields and each field is an input of a chart. The mapping, the data definition, the operators and the dataset are stored as a chart application.

When a selection of a graphical user interface (GUI) component is received from the user, the selection can be of a GUI component that represents Structured Query Language (SQL) code. A representation of the data definition, the one or more operators, the dataset and the mapping can be displayed. The SQL code that corresponds to the mapping can be displayed. Receiving the mapping can include receiving user input forming a line from the data field to an operator and to a field in the dataset.

In yet another aspect, the invention is directed to a method of creating a chart definition. One or more sources for data are defined. One or more operators to be applied to the data are defined, where applying the operators to the data generates a key performance indicator. A chart type is selected. One or more labels for the chart type are selected. A link is provided, wherein selection of the link causes an engine to create an instance of the chart that includes key performance indicators.

In another aspect, the invention is directed to a method of providing a dynamic chart to a user. A chart definition is created. Creating the chart definition includes defining one or more sources for data and defining one or more operators to be applied to the data. A link is provided to the chart definition. Selecting the link causes an engine to create an instance of a chart, wherein the chart includes real time or near real time data that has been transformed to one or more key performance indicators by the one or more operators, the data being from one or more sources of data at the time that the link is selected.

Providing a link to the chart definition can include retrieving data from a database upon receiving input from a user requesting the chart. Retrieving data from a database can include retrieving data from a plurality of databases.

In yet another aspect, the invention is directed to a computer program product for creating a chart displaying one or more key performance indicators, embodied on computer readable-material. The product includes executable instructions for causing a computer system to receive a request for a representation of a key performance indicator in a chart, determine sources for data, retrieve the data from the sources, perform operations on the data to obtain one or more key performance indicator values, display the one or more key performance indicator values in the chart, determine whether updated data is available and if there is updated data, revise the chart to reflect the updated data.

In yet another aspect, the invention is directed to a computer program product for creating a dynamic chart definition, embodied on computer readable-material. The product includes executable instructions for causing a computer system to receive from a user a data definition, wherein the data definition includes one or more data fields. The instructions cause the computer system to receive from a user a selection of operators for at least one of the data fields, wherein the user selects the one or more operators from a list of graphical representations of operators, and to receive a mapping between the one or more operators and the data field to a dataset, wherein the dataset has one or more fields and each field is an input of a chart. The instruction cause the computer system to store the mapping, the data definition, the operators and the dataset as a chart definition.

In another aspect, the invention is directed to a computer program product for creating a chart definition, embodied on computer readable-material. The product includes executable instructions for causing a computer system to define sources for data, define operators to be applied to the data, where applying the operators to the data generates a key performance indicator values, select a chart type, select one or more labels for the chart type; and provide a link, wherein selection of the link causes an engine to create an instance of the chart including the key performance indicator values.

In another aspect, the invention is directed to a computer program product for providing a dynamic chart, embodied on computer readable-material. The product includes executable instructions for causing a computer system to create a chart definition, including instruction to cause a computer system to define one or more sources for data and define one or more operators to be applied to the data. The product also includes instructions to provide a link to the chart definition, wherein selecting the link causes an engine to create an instance of a chart, and the chart includes real time or near real time data that has been transformed to one or more key performance indicators by the one or more operators, the data being from one or more sources of data at the time that the link is selected.

In another aspect the invention is directed to a system for creating a chart. The system includes a data retrieval engine for retrieving data from one or more sources, an operator engine for performing operations on the data to determine one or more key performance indicators and a charting engine for creating a chart including the one or more key performance indicators. The system can optionally include an updating engine for updating at least one of the key performance indicators in the chart.

Business activity monitoring involves collecting, aggregating and presenting business activity data according to specified Key Performance Indicators (KPIs). KPIs can provide a context for business processes by turning raw data into useful information. The KPIs can be presented in an easily readable chart format. Charts can also be updated in real time, so that a user can see the most up-to-date information.

Advantages of the invention can include none, one or more of the following. Data can be compiled and put into a chart on the fly, so that real time or near real time data is provided to a viewer rather than data that has been stored in a queue and may not be up to date. A chart format can be used for real time business monitoring. A KPI can be bound to a chart or other graphical representation. How labels are displayed in a chart can be controlled, so that the charts are more user friendly. Users can have more flexibility in customizing charts.

The details of one or more embodiments of the invention are set forth in the accompanying drawings and the description below. Other features, objects, and advantages of the invention will be apparent from the description and drawings, and from the claims.

DETAILED DESCRIPTION

An Integrated Composite Application Network (ICAN) Suite is provided to allow enterprises to rapidly provide configurable and automated business process flows. The ICAN Suite assembles the functionality in existing applications and systems and delivers a fully distributed, centrally managed solution for the rapid assembly, deployment, and management of enterprise-scale, end-user applications. In one implementation, the ICAN Suite provides a completely open, standards-based, service-oriented architecture that includes a fully J2EE-certified, portable, integrated composite application network. The ICAN Suite enables the creation of composite applications including enterprise-scale, interactive, end-user applications that span multiple, cross-organizational business processes to connect all necessary people, systems, and devices. The ICAN Suite allows business users, as well as developers, to easily create interactive applications that call on available business processes and Web services, packaging pages together as a coordinated composite application. An ICAN Suite is available from SeeBeyond, Inc.

Figure 1:
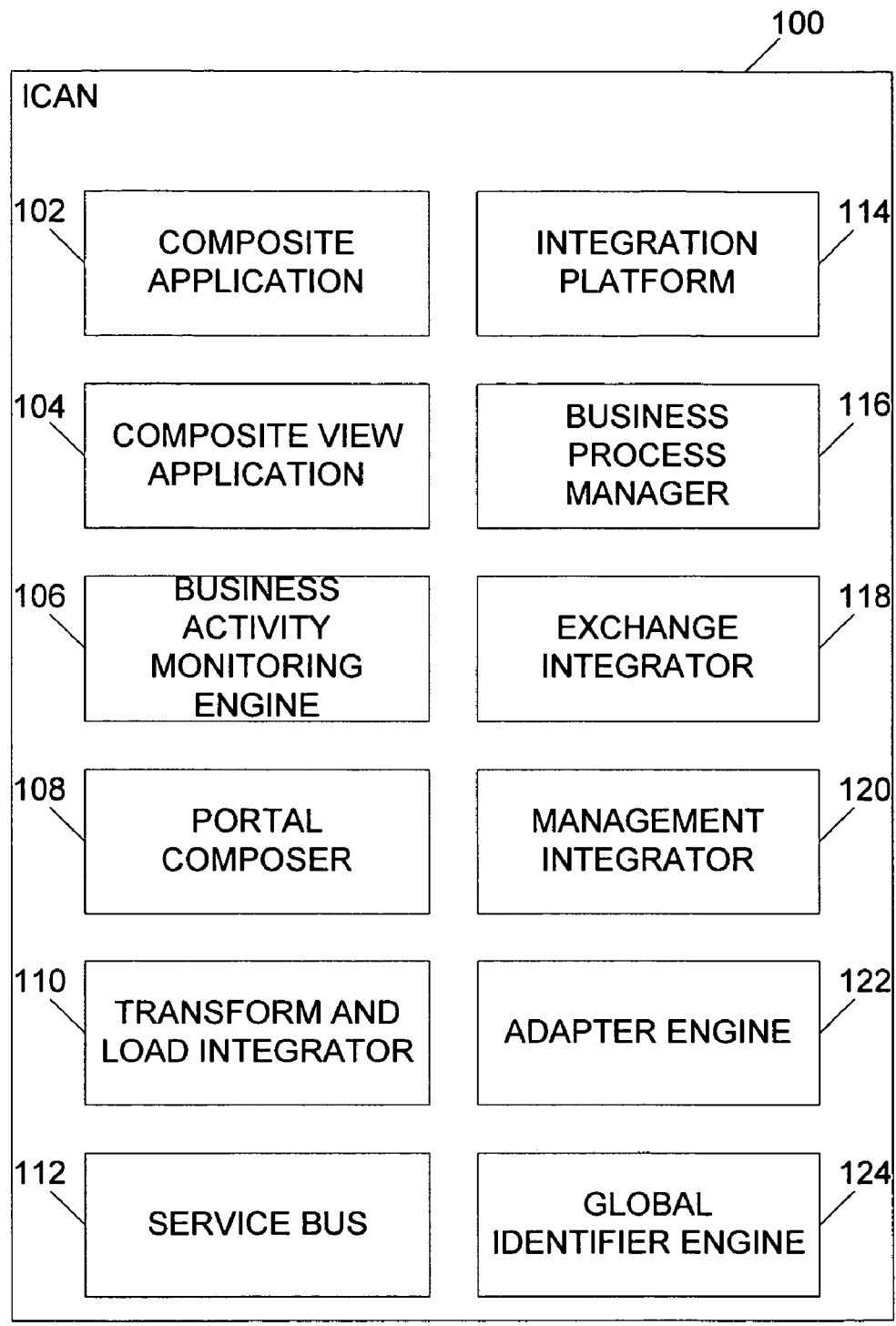
FIG. 1 is a block diagram of an Integrated Composite Application Network Suite.

As shown in FIG. 1, in one implementation, the ICAN Suite 100 includes twelve core engines including a composite application engine 102, a composite view application engine 104, a business activity monitoring engine 106, a portal composer 108, a transform and load integrator 110, a service bus 112, an integration platform 114, a business process manager 116, an exchange integrator 118, a management integrator 120, an adaptor engine 122, and global identifier engine 124.

The composite application engine (referred to as eVision Studio) 102 enables the rapid design and generation of interactive Web and wireless composite applications (in one implementation, without any programming), creating end-user business interfaces that overlay composite applications and workflow management.

The composite view application engine (referred to as eView Studio) 104 enables the rapid design and generation of "single-view" composite applications for cleansing, matching, and indexing user-defined business objects, such as customers, businesses, or products, that are not uniquely identified across all enterprise systems.

The business activity monitoring engine (referred to as eBAM Studio) 106 is a tool for rapidly designing and generating BAM composite applications (in one implementation, without any programming), consisting of real-time alerts, graphical dashboards and reports, and key performance indicators (KPIs) defined by business users.

The portal composer (referred to as ePortal Composer) 108 is a full-featured portal generation tool providing aggregation of any Web-based channel with content personalization and administration services.

The transform and load integrator (referred to as the eTL Integrator) 110 provides Extract, Transform, and Load (ETL) functionality optimized for very large record set and bulk data transformation and movement scenarios, fully integrated with the rest of the business integration suite.

The service bus (referred to as the eInsight Enterprise Service Bus) 112 provides coordination for enterprise Web services.

The integration platform (referred to as eGate Integrator) 114 provides a Web services and J2EE-based integration platform.

The business process manager (referred to as eInsight Business Process Manager (BPM)) 116 is an open and Web services-based BPM solution.

The exchange integrator (referred to as eXchange Integrator) 118 provides a solution for defining trading partner profiles and protocol management for B2B interoperability.

The management integrator (referred to as eXpressway Integrator) 120 provides enhanced management capabilities for streamlined distribution, configuration, and management of the various ICAN Suite engines and services.

The adapter engine (referred to as eWay Intelligent Adapter) 122 provides a line of pre-built adapters for common applications and datastores, and in one implementation is enhanced to support JCA as well as expose applications as Web services.

The global identifier engine (referred to as eIndex Global Identifier) 124 provides an indexing solution enhanced for Web-based access and user configuration of matching criteria.

The business activity monitoring engine (referred to as eBAM Studio) 106 is a tool for rapidly designing and generating business activity monitoring (BAM) composite applications. In one implementation, BAM composite applications are designed and generated without any programming. A BAM composite application that is designed and generated using the business activity monitoring engine 106 can intercept the flow of data through the ICAN suite 100. Based on the intercepted data, the BAM composite application can produce real-time alerts, graphical dashboards and reports, and display key performance indicators (KPI) defined by users.

Graphic representations of data can assist in monitoring a business activity. A graph can be used to monitor activities within an enterprise in real time or in near real time. Graphics, such as charts, can help provide a viewer with information in an easy to read and visually pleasing format. Adding meaningful labels to the chart and logically placing such labels can also assist the viewer in understanding the meaning of the data. If the chart is created at the time the chart is called, the chart can include up-to-the minute information. Current information is typically more valuable for determining the state of a business activity than outdated information. With up-to-date information in an easy to read format, a viewer can quickly obtain an overall sense of business performance, or spot specific data trends or anomalies.

Figure 2:
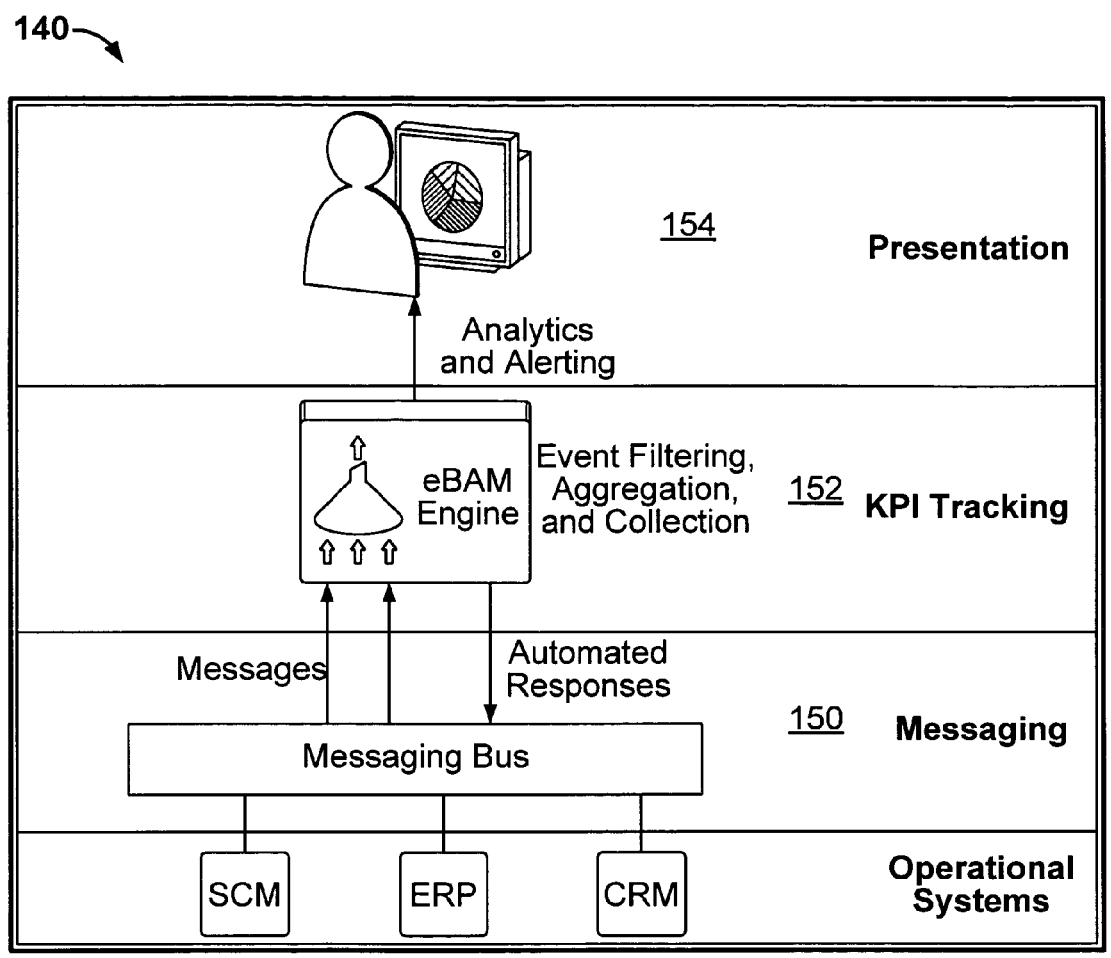
FIG. 2 is a shows a schematic of an enterprise system.

Referring to FIG. 2, the architecture of a BAM composite application 140 can include three layers, a messaging layer 150, a monitoring layer 152, and a presentation layer 154. The messaging layer 150 can communicate with external systems, e.g., using a messaging bus, to intercept data from external sources, e.g., the ICAN suite processes. The monitoring layer 152 can track data that is of interest to business users. The monitored data can be used to generate and pass upward to the presentation layer 154 charts describing Key Performance Indicators (KPIs). The presentation layer 154 can provide a GUI that allows business users to see the charts. In creating a BAM composite application 140, the BAM engine 106, through its graphical user interface, allows business users to define the KPIs that are of interest to the business users.

Figure 3:
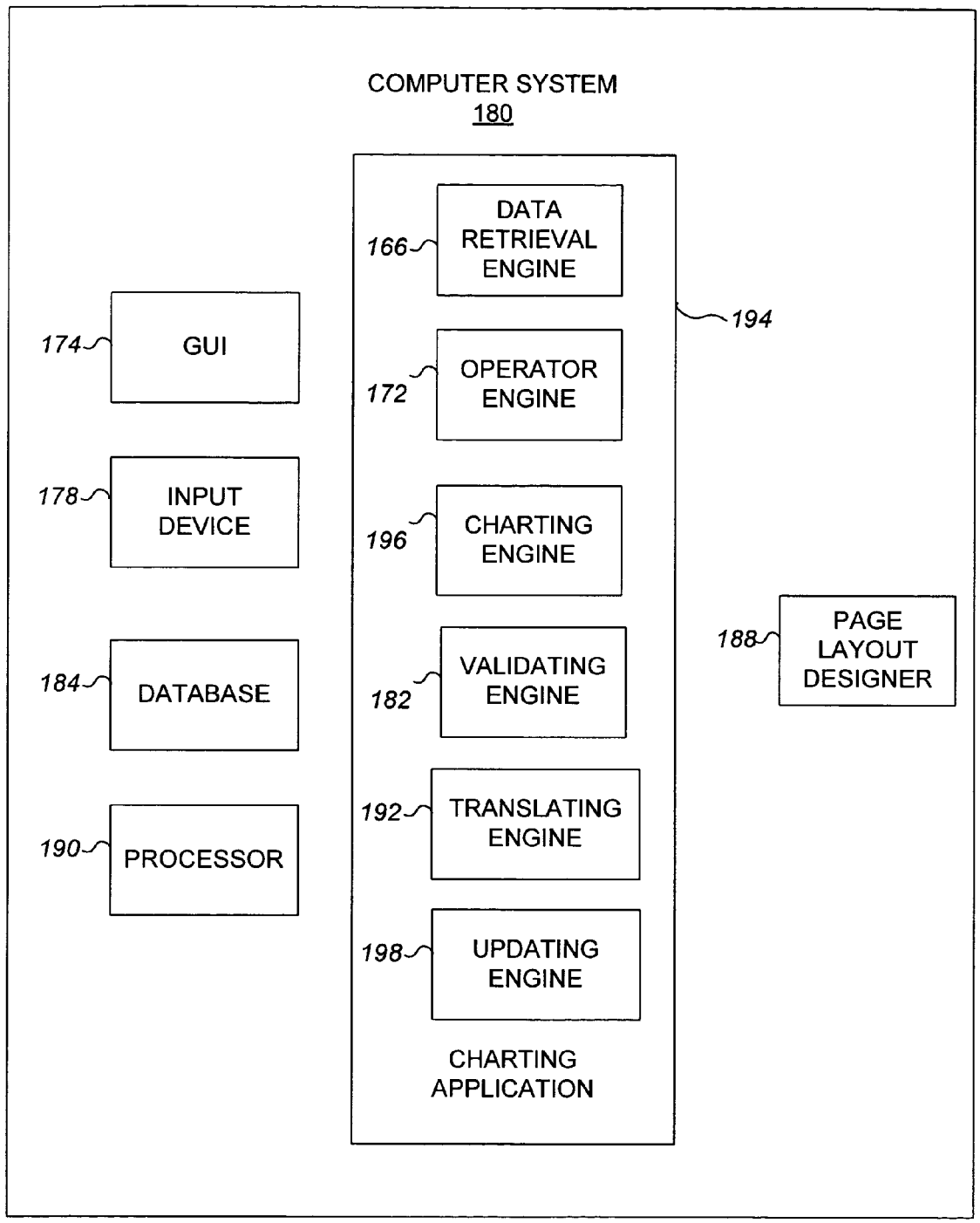
FIG. 3 is a block diagram of a computer system.

Referring to FIG. 3, a computer system 180 is provided for a user to create a charting application, which can be a BAM composite application. The computer system 180 includes a GUI 174 for displaying information to the user. The user can enter input into the computer system 180 using an input device 178, such as a mouse, a keyboard, a pen or other such input device. A database 184 stores information, such as data, data definitions, records, and charting applications. A processor 190 processes data for the charting application. A validating engine 182 validates data definitions to determine whether the data definition has been set up correctly.

The computer system 180 also includes a charting application 194, which includes a data retrieval engine 166, an operator engine 172, a charting engine 196, a validating engine 182 and a translating engine 192. The data retrieval engine 166 retrieves stored data from the database 184, such as information about transactions (e.g., number of sales, time since a customer has released a product, length of time required to complete a transaction, etc.). In some implementations, the data retrieval engine 166 monitors data as the data enters an enterprise system, e.g., as the data enters the ICAN suite 100. In some implementations, the charting application 194 includes an updating engine 198.

The operator engine 172 performs operations, as indicated in a chart definition, on the retrieved data. The operations in one implementation are SQL operations performed on the data.

The charting engine 196 creates a chart, according to instructions in a charting application. The charting engine 196 can determine a type of chart to create and where in the chart to input the data that has been retrieved and/or operated upon.

The translating engine 192 translates mapping between fields and graphic operators into code, such as SQL code.

The validating engine 182 validates code behind a operation that is performed on data, to ensure that there are no errors before the code is stored or used at runtime.

The computer system also includes a page layout designer 188, which instructs the computer system to instantiate a chart when the chart is requested.

The updating engine 198 can update the KPIs in the chart on a periodic basis, or as requested by a user.

A charting application 194 can be specified to gather and compile raw data and processes the data to create a chart. Further, the charting application 194 can be designed to process the data to create charts according to a chart definition.

A chart definition includes a description of data to be retrieved to create a chart, herein a data definition, operations to be performed on retrieved data and data that is to be used to instantiate a chart. The chart definition also indicates the type of chart to be created and properties of the chart, including where to place or how to use the data in the chart, as described further herein.

Figure 4:
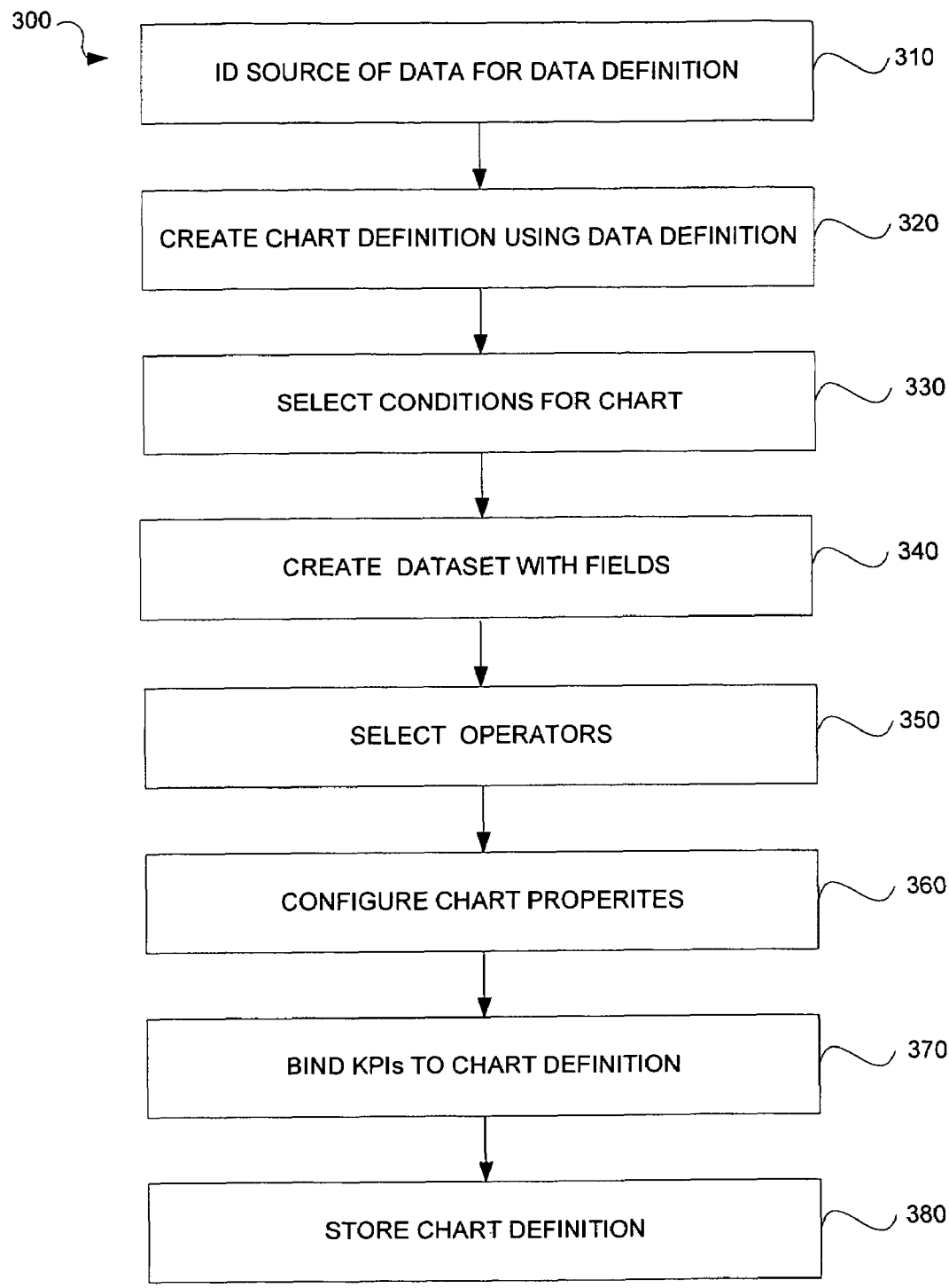
FIG. 4 is a flow diagram describing formation of a chart displaying a KPI.

Referring to FIG. 4, a method 300 is described for creating a charting definition including defining how a chart is going to be displayed. A designer specifies a data definition, including a source of the data (step 310). The data can be pulled from one or more systems, queues, databases, etc., within the enterprise. In some implementations, the data can be retrieved from one or more systems outside of an enterprise. The data definition includes one or more data fields and can include information on how to label and organize the data.

The data fields can be of a data type, such as, character, float, integer, timestamp or variable character. For each data field, a name and a default value can be assigned. The data definition can also determine how long the data definition is to be retained. Examples of such data definitions are shown in Tables 1A and 1B.

TABLE 1A

| | Name | Default Value | Data Type |
|---|---|---|---|
| 1 | OrderNum | 999999999 | integer |
| 2 | DateOfOrder | 2099-12-31 23:59:59 | timestamp |
| 3 | CustName1 | !! Customer Name Must Be Supplied !! | varchar |
| (...) | (...) | (...) | (...) |
| n | TotalDollarsThisOrder | | float |

TABLE 1B

| Name | Type | Meaning |
|---|---|---|
| datasource | char | A one-character code indicating which path to follow (A, B, or C) in the InputUpdate BP. Path A is for new data; path B is for complete records of revised data; and path C is for revised units-sold data only. |
| carModelYear | integer | Model year, such as 2004 or 2002. |
| carModelName | varchar | Model name, such as "Excursion" or "Camry". |
| carManufacturer | varchar | Manufacturer, such as "Ford" or "Toyota". |
| carType | varchar | Type of car, such as "SUV" or "car". |
| carBasePrice | float | Price, such as 35990.00 or 18990.00 |

TABLE 1B-continued

| Name | Type | Meaning |
| --- | --- | --- |
| carUnitsSold | integer | Number of cars sold of this type, such as 875 or 1063. |

The format of the data can be specified, as shown Table 2.

TABLE 2

| Item | Choices | Notes |
| --- | --- | --- |
| Encoding scheme | ASCII (ISO646-US) UTF-8 EBCDIC: USA-Canada (cp037) | ASCII - 7-bit encoding, roman characters. UTF-8 - 8-bit encoding of Unicode. EBCDIC - for certain mainframe systems |
| File format | Delimited Fixed-width | Delimited files specify escape characters to distinguish fields in a record and one record from the next; fixed-width files specify a preset length for each record. |

In one implementation, when the data is retrieved from a source, the data is included in a larger data group. The desired data group can be parsed and a subset of desired data can be selected for further processing. The data definition can include instructions regarding parsing or delimiting the data that is retrieved. Table 3 shows the values for parsing delimited data.

TABLE 3

| Item | Value | Notes |
| --- | --- | --- |
| Default SQL Type | Any of the following: bigint, bit, char, date, decimal, double, float, integer, longvarchar, numeric, real, smallint, time, timestamp, tinyint, varchar | |
| Record Delimiter | {newline (lf)} {cr} {cr-lf} | newline - each new line starts a new record. cr - each carriage–return starts a new record. cr-lf - each carriage–return+linefeed starts a new record. You can type also type in a character or control character; for example, to specify TAB, type in: \t |
| Field | {comma} {tab} {pipe} | {comma} - each instance of, starts a new field. {tab} - each tab character starts a new record. {pipe} - each instance of \| starts a new field. |
| Text Qualifier | none " ' | You can indicate whether text is distinguished by quotemarks; only doublequotes or singlequotes are supported. |
| First line contains field names? | False True | You can indicate whether the first record of the data consists only of labels for the fields, rather than actual data. |

If the data is fixed-width data, the values for determining parsing can be as found in Table 4.

TABLE 4

| Item | Value | Notes |
| --- | --- | --- |
| Default SQL Type | Any of the following: bigint, bit, char, date, decimal, double, float, integer, longvarchar, numeric, real, smallint, time, timestamp, tinyint, varchar | |
| Record Length | 0 | To override the default, type in a nonzero number. |
| HeaderBytesOffset | 0 | To override the default, type in a nonzero number. |
| Field Count | 0 | To override the default, type in a nonzero number. |

The selections for determining the data definition can be validated by the validating engine to ensure that the metadata has been set up correctly.

A chart definition is created using the data definition (step 320). Creating the chart definition can include the designer selecting a name to be associated with the chart. The type of chart can also be specified in the chart definition. The chart can be one of a pie, bar, graph, area, line, table, scatter plot, waterfall, xy step area, meter, traffic lights, dial type chart or other chart type. Summary charts can display one series of data, category charts can display several series of data.

One or more conditions can be selected for the data definition (step 330). When the conditions are met, the data is eligible for further processing. The conditions are operations that can be performed on retrieved data. In some implementations, the conditions are SQL operations.

A dataset is created with one or more fields (step 340). A value in each field can represent a component of the chart, such as a value that appears along an axis, e.g., an X axis or a Y axis, as a value that determines the size of parts of the graphs, such as the height of bars in a bar graph, a percentage of a pie in a pie chart, a location of a line in a line graph, a label in the chart other such portions of the chart. As described herein, the values for the fields are completed at runtime according to the fields of the data definition and operators that can be selected for each of the fields in the data definition.

Zero, one or more operators are selected (step 350). Operators can include comparisons, Boolean operators, number operators, SQL-specific operators, string operators or other suitable operators. An operator can be specified for one or more of the data fields in the data definition. Multiple operators can be selected for each field of the data definition, or multiple fields of the data definition can be associated with a single operator. The operators are used to relate the fields of the data definition with the values that are obtained for a dataset. The values in the dataset are used to instantiate a chart. That is, the operators that are selected determine a mathematical or logical formula for determining the desired KPI value that is to be displayed in the chart.

The chart's properties are configured (step 360). Properties can be selected for the chart, such as update frequency, size, color, font, spacing and other properties. Additional properties that can be set include properties specific to the title, such as whether the title is displayed, the characters, the font, alignment, color and background of the color. Borders can be selected and specified for the chart. The chart width and height can be selected. A maximum number of rows that can be retrieved and used as data in the chart or displayed at one time, can be specified. A legend and a placement for the legend can be selected. How often the chart is updated with new data can be specified.

Determining a value for the field of the dataset determines a value for the KPI. Binding one or more KPIs to a chart definition determines the information conveyed in the chart upon instantiation (step 370). As shown in Table 1B and FIG. 9, the value of car manufacturer is mapped as a category, the value of car model name is mapped as a series and the values for car base price and car units sold are multiplied together and summed (because of the operator can handle multiple records) with the result mapped as a value. The chart definition is then stored (step 380).

Tools can be provided for a designer to create a chart definition. In some implementations, the tools includes one or more features described herein.

Figure 5:
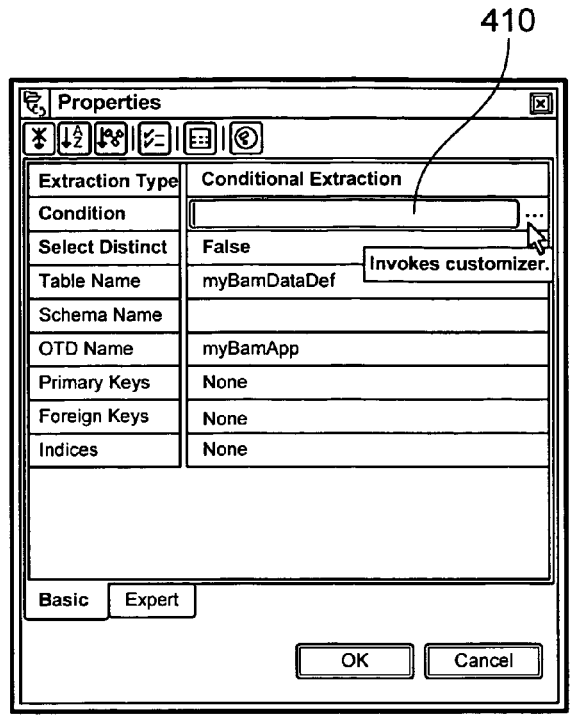
FIG. 5 shows a GUI for setting a condition.

Referring to FIG. 5, a condition for a field of a data definition can be created by providing a condition name 410. The designer is able to modify the data definition by adding conditions to each field of the data definition using a GUI component, such as an icon or display with boxes that can be checked. In one implementation, the GUI component corresponds to commands in a language that is capable of accessing a database, such as native SQL commands. When the chart is instantiated, the SQL command that was selected by the designer is performed on the data field. SQL herein can be any SQL language, such as Oracle8, Oracle9, SQL Server, internal SQL, ANSI92 or other SQL languages.

Figure 6:
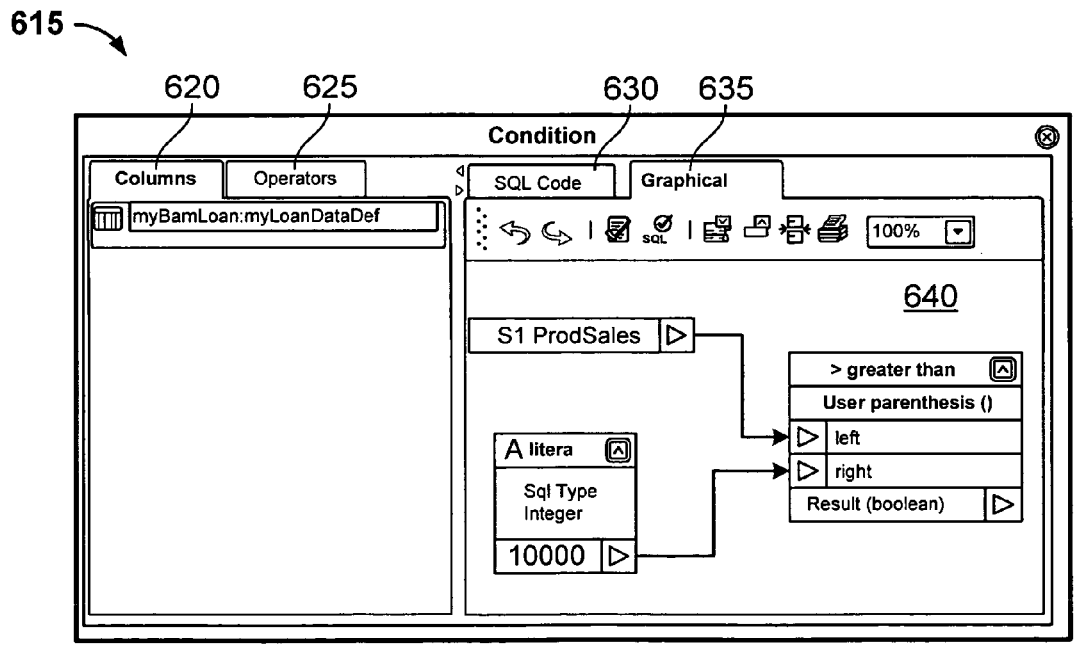
FIG. 6 shows a GUI for configuring the condition.

Referring to FIG. 6, in some implementations, a GUI is provided for setting zero or more conditions on the data fields in the data definition. In some implementations, a condition editor 615 is provided to allow the user to select a condition to be applied to a data field. The condition editor 615 can allow a user to construct filters that constitute a condition on the data definition. In some implementations the condition editor 615 allows a user to enter a native SQL command in text form. In some implementations, the condition editor 615 includes graphical means for entering SQL commands.

The condition editor 615 can include tabs 620, 625, 630, 635. The user can toggle between different portions of the editor using the tabs. In one implementation, two of the tabs are for tree listings, here columns and operators, and two of the tabs are for user modes, here SQL code and graphical. A columns tab 620 lists the data fields by name in the data definition. When the columns tab 620 is selected, a data field can be selected and added to a canvas, such as canvas 640, which is displayed when a graphical tab 635 is selected, or a canvas that is displayed with a SQL code tab 630 is selected. Operations can then be specified for each element on the canvas 640. When an operations tab 625 is selected, SQL operations are listed. The SQL operations can be dragged onto the canvas 640 and associated with a data field that is on the canvas 640. A condition includes one or more operations, inputs and outputs. The inputs drive the operations and the outputs determines if the condition is set.

A SQL code tab 630 provides the user with a location to enter native SQL commands or place data fields or operators from under the columns tab 620 or the operators tab 625, respectively. A graphical tab 635 allows a user to create conditions by selecting fields and operators from under the column tab 620 and operator tab 625, respectively, and placing them on a canvas 640. A user can toggle between a SQL code view and a view of a graphical representations of the operators and data fields, such as by selecting the tabs 630 or 635.

Figure 7:
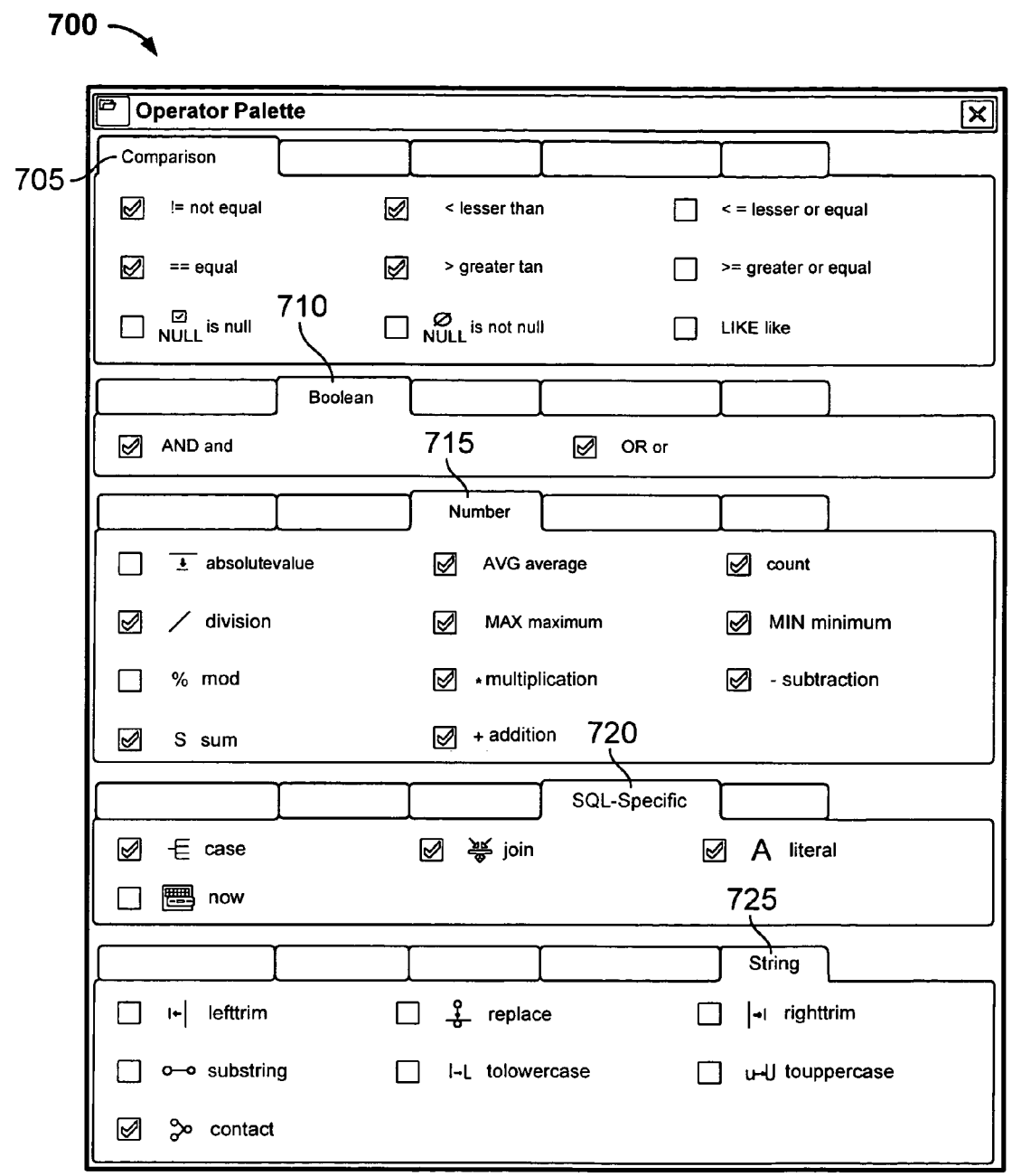
FIG. 7 shows a GUI of a palette with available operators.

Referring to FIG. 7, in some implementations, an operator palette 700 is provided, which includes multiple tabs 705, 710, 715, 720 and 725, under which the operators are organized. A comparison tab 705 can include operators, such as comparisons, not equal, equal, lesser than, greater than, lesser or equal, greater or equal, null, not null and like. A Boolean tab 710 can include Boolean operators, such as "and" and "or". A number tab 715 can include operations to be performed on values, such as absolute value, division, modulus, sum, average, maximum, multiplication, addition, count, minimum and subtraction. A SQL specific tab 720 can include operators, such as case, now, join and literal. A string tab 725 can include left trim, right trim, replace, substring, to lower case, to upper case and concatenate. Other operators as known to those of skill in the art can also be included on the operator palette 700.

Figure 8:
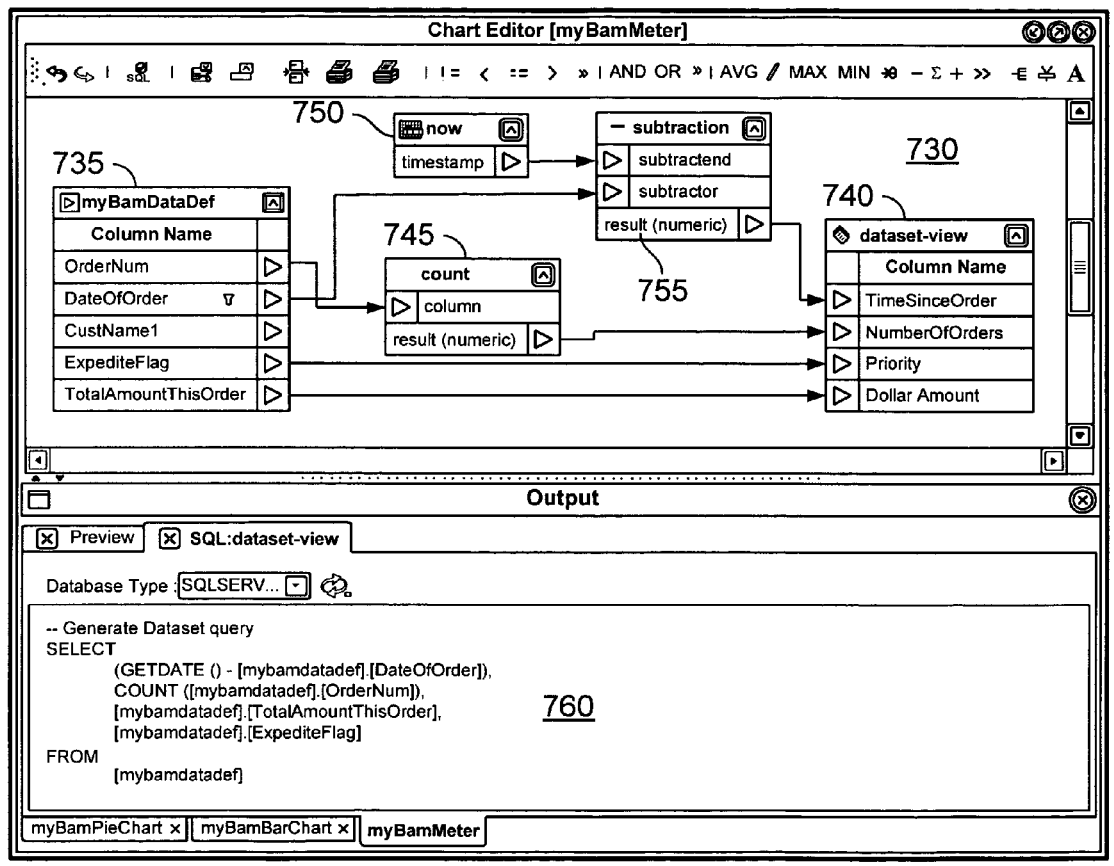
FIG. 8 shows a mapping between data fields and operators.

Referring to FIG. 8, a canvas 730 can be provided for mapping the data definition to the dataset (e.g., an output). The canvas 730 can be a WYSIWYG Web page editor. The selected data definition 735 is positioned on the canvas 730. The dataset 740 includes fields for a resulting chart. Operators 745, 750, 755 are mapped to the data definition 735 fields and the results of the mapping are mapped to the dataset 740. Because the operators are represented as objects, the operators can be selected (e.g., dragged and dropped) onto a canvas 730 between the data definition and the dataset 740 and zero or more fields can be mapped from the data definition through zero or more operators.

A pane 760 can display the SQL code that corresponds to the mapping shown on canvas 730. The translating engine translates the mappings into the SQL code, so that the designer need not program the instructions for forming a chart, such as by coding in SQL, but rather merely by using graphical means, such as selecting the desired inputs and outputs, for example, by dragging and dropping or checking a box. A designer using graphical inputs for creating the chart need not know how to code in SQL, or can be prevented from making a mistake when entering code. Further, a mapping between the data definition fields, the operators and the dataset fields can be changed by altering the connections between the fields and the objects on the canvas 730. No re-coding is required to reconfigure a chart or change the data to be placed in a chart.

Figure 9:
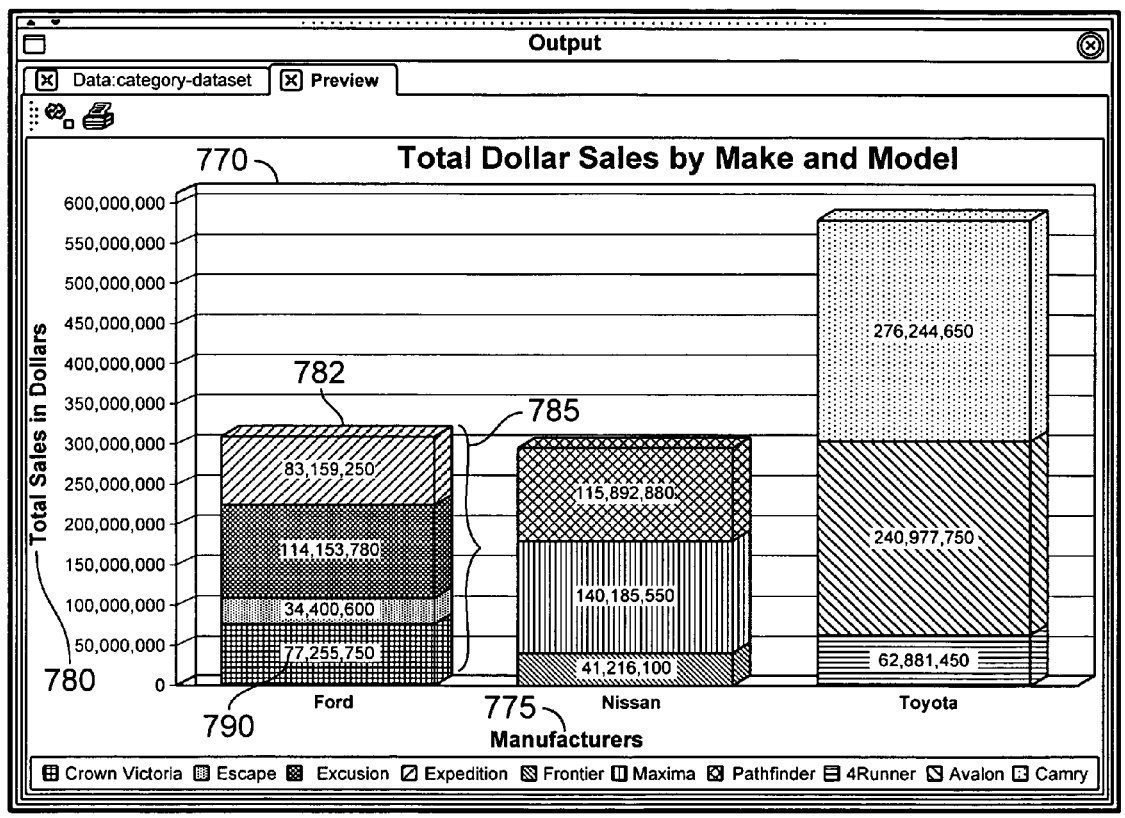
FIG. 9 shows a bar chart that is bound to a KPI.

Various types of charts can include properties specific to the chart type. Referring to FIG. 9, in a bar chart 770, a category can be assigned to the x-axis 775 and a category can be assigned to the y-axis 780. With a stacked chart, a series 785 can be displayed for each bar 782. In addition, a value 790 can be added to each bar 782.

Figure 10:
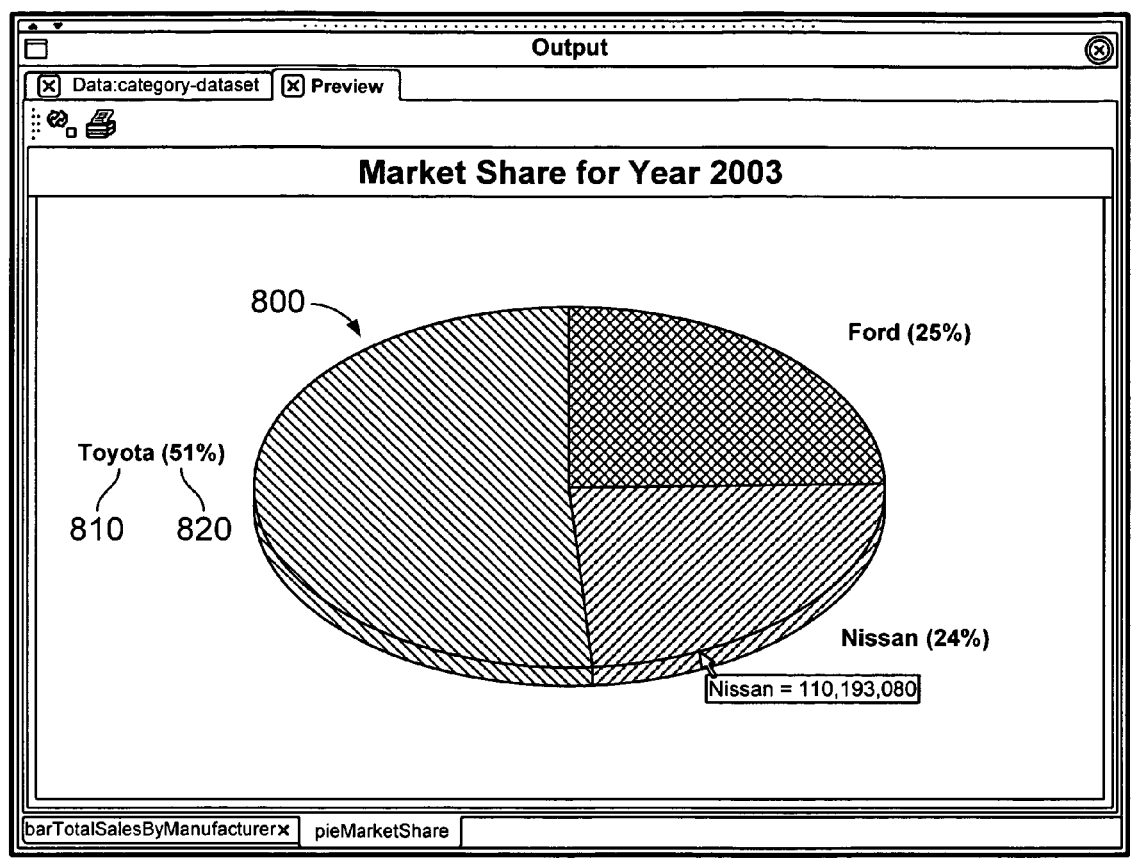
FIG. 10 shows a pie chart that is bound to a KPI.

Referring to FIG. 10, a pie chart 800 can have one or more labels 810 for each section, and one or more values 820 for each section, such as calculated values. The organization of the sections can be selected, such as by placing successively smaller sections in a clockwise direction. The sections can be spaced apart by a gap.

Figure 11:
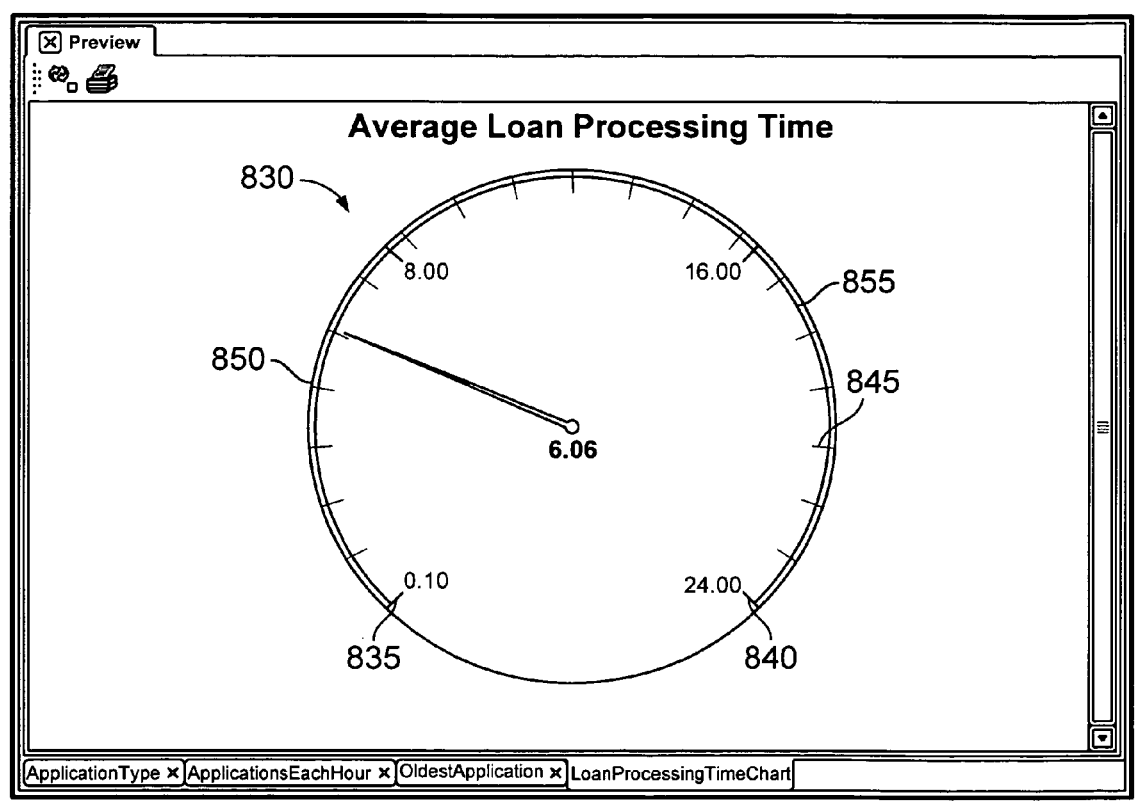
FIG. 11 shows a meter chart that is bound to a KPI.

Referring to FIG. 11, the properties for a meter chart 830 can include minimum 835 and maximum 840 values, whether and where to show tick marks 845 and colors for normal 850 and warning 855 ranges.

For a traffic light chart (not shown), a range of values can be specified for each color. The number of lenses to display can be specified, such as one, two or three. The orientation of the traffic light can be selected, such as a vertical or horizontal. For any of the charts, labels can applied. The display of the labels, such as the orientation, location, font, size and content can be selected. The chart can also be sized.

The chart can be deployed by posting the chart to a server with an engine, such as an engine in the tracking layer, configured to receive data defined in the data definition, process the data to create the chart and send the chart to a user. The deployment can include adding a link to the chart in a Web page. Deployment and a tool for applying a chart to a Web page is described further below.

One or more applications, such as the composite application 102, which are based on a Model/View/Controller (MVC) architecture can access the chart definitions, create a chart based on chart definition and up-to-date information in one or more databases or other sources of data, and provide the dynamic chart to a user. MVC is a software development paradigm that can enhance a task of building software systems, particularly software systems that generate multiple, synchronized presentations of the same data. For example, MVC is ideal for developing graphical statistical presentation applications requiring simultaneous rendering of the same data in bar, line, and pie chart formats. The MVC architecture includes three types of objects: model, view, and controller objects.

The model object represents the data in a program that manages behaviors and data within an application. The model responds to requests for information about the model's current state (typically requested by the view) and responds to instructions to change state (typically requested by the controller).

The view object manages the visual display of the model data; for example, displaying charts to users in a browser.

The controller object enables user interaction with the model data; for example, mouse and keyboard inputs from the user, which instruct the model and/or view to perform an action.

User input, modeling of the external world, and visual feedback can be managed by MVC objects, where each object is specialized for a task. For example, in one implementation, the model, represented by a page flow, includes business logic (e.g., object type definitions and collaborations) that interact with one or more back-end system applications. The view includes JavaServer Pages (JSPs) that are generated with a page layout designer. The controller is a Web-enabled page flow created with a page flow designer. The controller orchestrates a sequence of pages being sent to the browser in response to user actions.

In some implementations, the steps for the Web application development include page layout, page linking, page flow, and binding and deployment. Page layout includes using the page layout designer 188 to create Web pages with pre-built GUI components. Page linking includes using, for example, a page link wizard to create links to Web pages and pass parameters from one page to another. Page flow includes using a page flow designer to connect finished Web pages to create a logical flow for an underlying business process. Finally, binding and deployment includes deploying Web applications into an environment for integration with other enterprise run-time components.

The page flow designer can facilitate a flow of Web-based business activities. Functions of the page flow designer include page flow modeling, monitoring, and execution, as well as the analysis of how data messages flow from page to page. The page flow designer can allow a business analyst to lay out a user workflow of a Web application by modeling a high-level, logical, page-by-page flow that users can follow through the Web application to complete a given task (i.e., the page flow). The business analyst can easily lay out a Web application's page flow using the page flow designer's set of intuitive, graphical modeling tools. At run-time, the page flow can drive a display of Web pages, such as pages having charts, and orchestrate interactions with one or more back-end systems. Through the deployment of Web pages that are developed with the page layout designer and page flow designer tools, the business analyst can provide enterprise-wide, internal and external access to Web applications across networks such as an intranet, or the Internet.

The page flow engine obtains data from back-end systems and orchestrates the system responses to the execution of Web page component code. At run-time, the page flow engine can execute page links and receive and process input human interaction.

Figure 12:
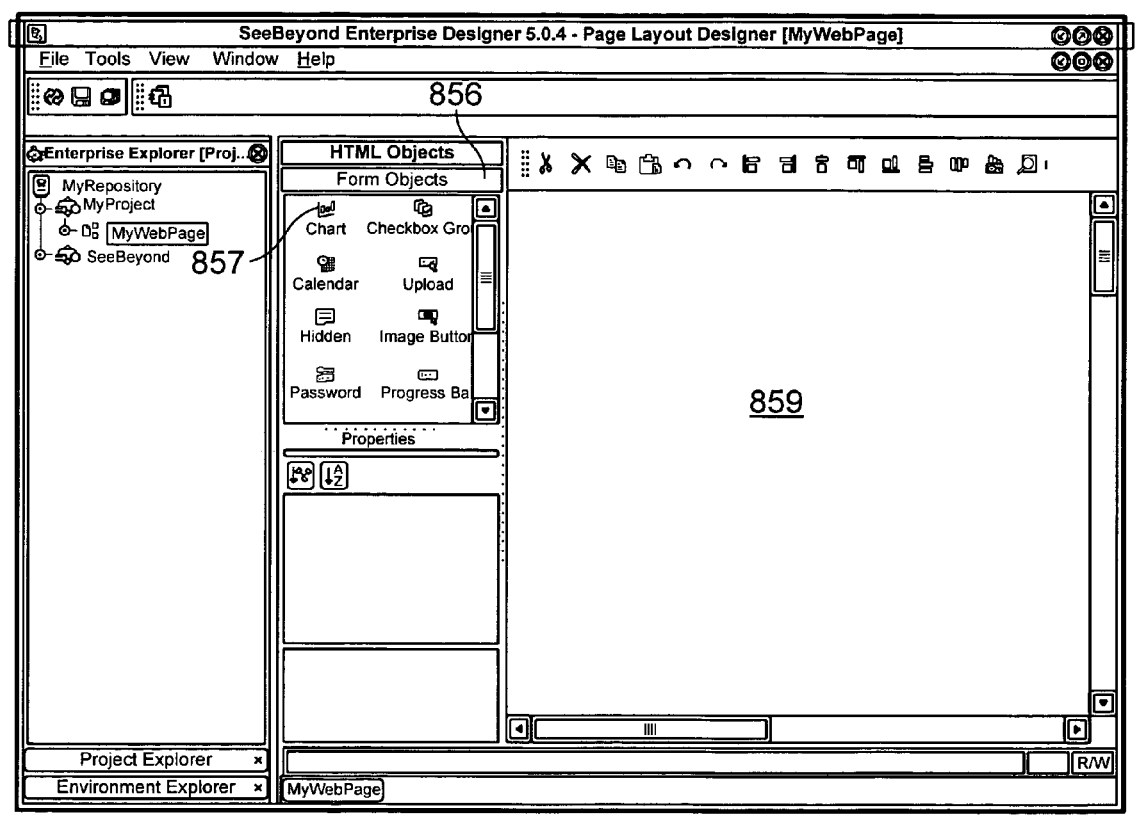
FIG. 12 shows a GUI for designing a Web page.

As shown in FIG. 12, through the use of drag and drop techniques and text-based input, the page layout designer 188 allows a user to interactively add graphics, text, and programmatic content to the Web pages in an application. The user can first open a new page layout within a GUI. The page layout designer is presented with a blank canvas 859. The page layout designer includes a toolbar 856 that allows the user to manipulate the objects placed on the canvas. The user can select a component from a palette including one or more pre-built components, such as chart components 857. The user can drag pre-built components from the component palette and position them on the design canvas. As the user creates a Web page, a preview of the design can be viewed in a browser.

Figure 13:
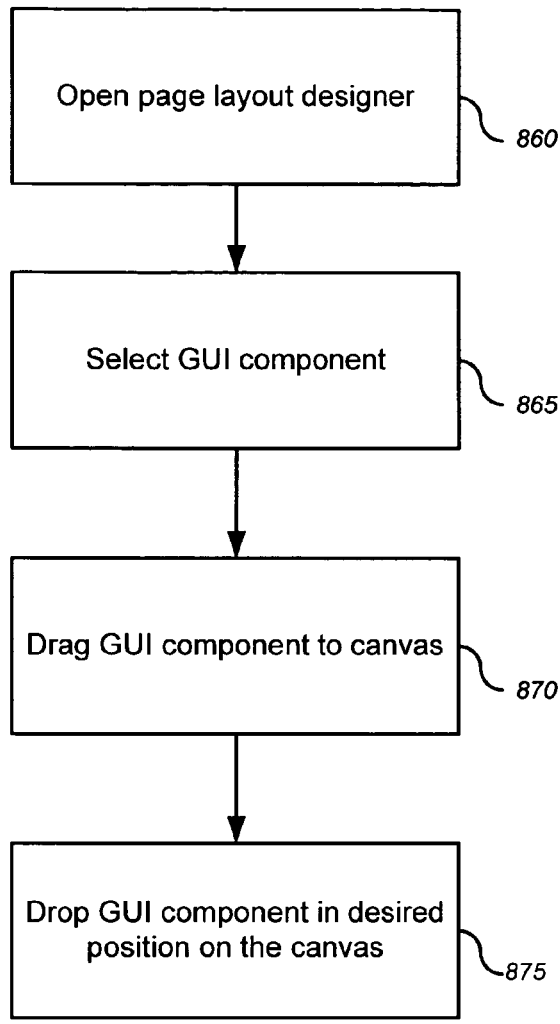
FIG. 13 shows a flow diagram describing adding a chart to a Web page.

GUI components can input data from the user at runtime, and add functions and interactivity to Web pages. GUI components can be added to the page layout designer canvas 859. FIG. 13 illustrates a process for adding a chart GUI component to a Web page. To add a chart GUI component to a Web page, the designer first opens a page layout designer (step 860). If the user opens a new page layout, the canvas in the page layout designer is blank. The user can then select a chart GUI component (e.g., with mouse) from a HTML objects or form objects palette (step 865). The user can then drag (e.g., by moving the mouse while holding the chart GUI object) the selected chart GUI component onto the canvas (step 870). Once the dragged GUI component is in a desired position, the user can drop the component onto the canvas (e.g., by releasing the mouse button) (step 880). The component can be configured prior to dragging the chart GUI component onto the canvas. The desired chart can be selected and the method described above in method 300 can be applied to the selected chart. Alternatively, the properties of the chart can be opened and the desired changes can be made.

Once the web page is configured, the page flow designer creates a logical flow for the underlying business process of the chart GUI. The page flow engine provides a user access to the chart by providing the Web page with a link to the chart. The page flow can correspond to the actions that are taken to create the chart, as described herein.

Figure 14:
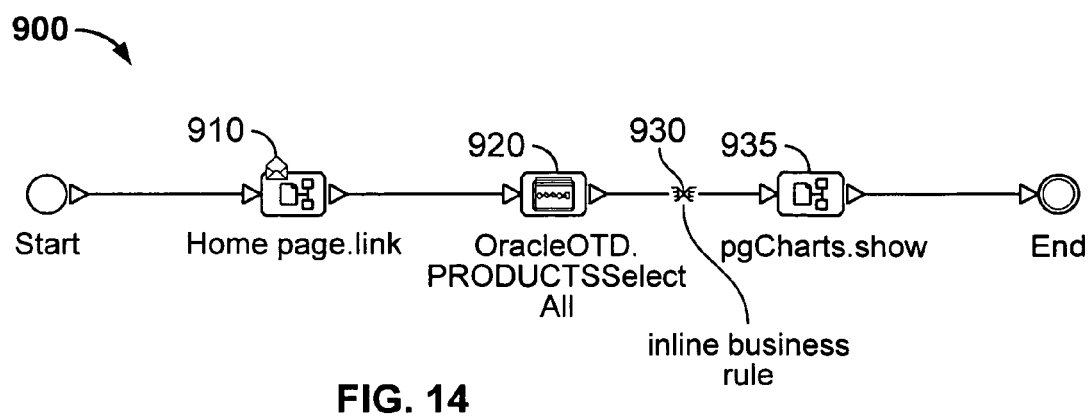
FIG. 14 shows the underlying business process for creating a chart.

An example of a page flow, or business process 900, for creating the chart, such as in a browser, is shown in FIG. 14. The business process 900 includes activities, or steps, for completing a task, such as creating a chart. In the first activity 910, the process receives a request from a user, such as a request to access a specified Web page that includes a chart. At the second activity 920, data required to create a chart is retrieved and processed (e.g., from a database, such as an Oracle database). Mapping then occurs in an inline business rule 930 between the second activity 920 and a third activity 935. The business rule processes the retrieved data according the operations selected by the user. The third activity displays the completed chart on the Web page.

Figure 15:
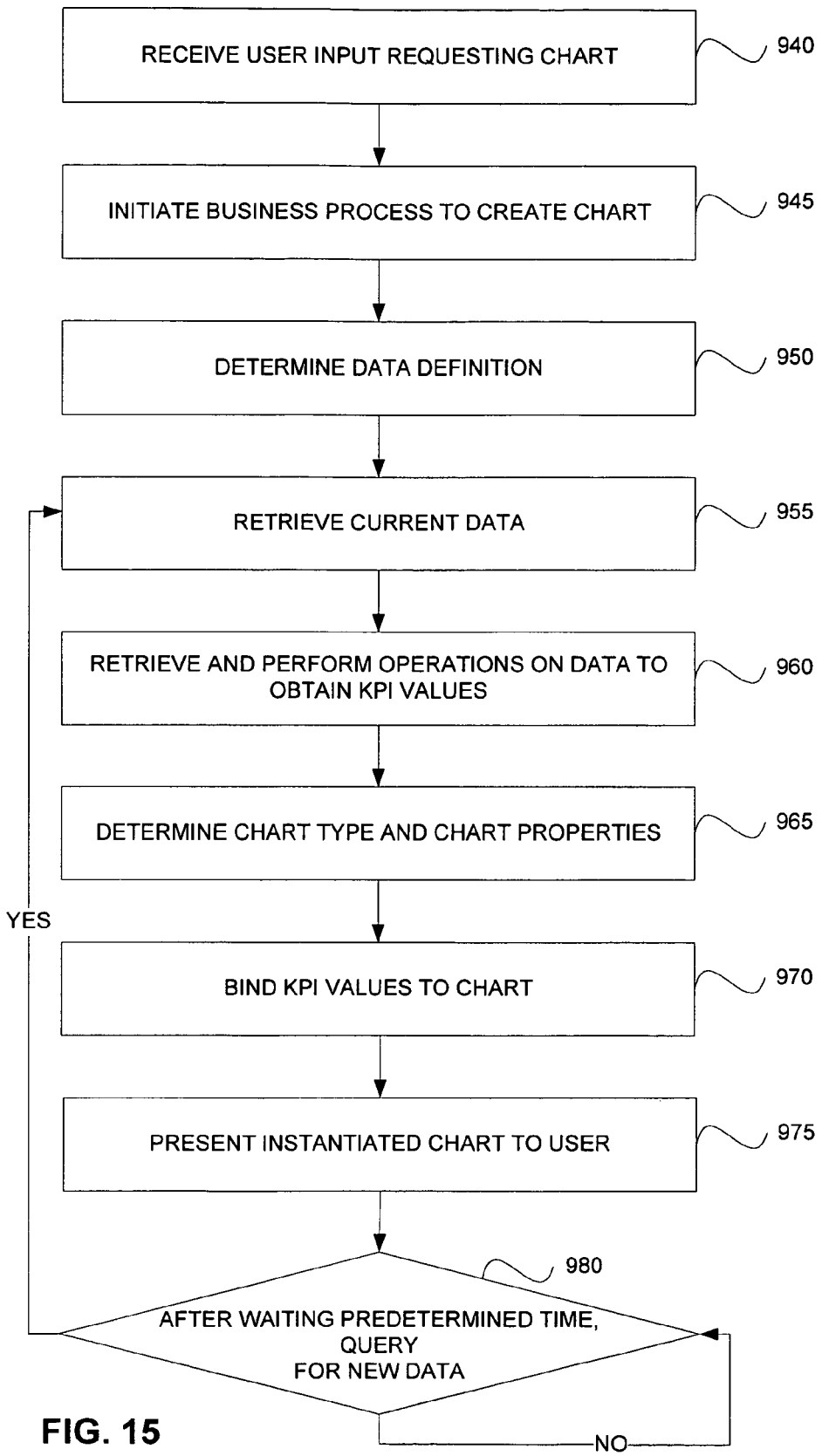
FIG. 15 shows a method of instantiating a chart.
Like reference symbols in the various drawings indicate like fields.

Referring to FIG. 15, a process for creating the chart on the fly (e.g., a dynamic chart) is described. User input selecting the chart is received (step 940). The business process that defines a chart from a chart definition is initiated (step 945). Which data definition is associated with the chart definition is determined (step 950). Current data is retrieved from data sources according to the data definition (step 955). Operations associated with the data fields are performed or retrieved data according to the mapping in the chart definition to obtain, for example, KPI values (e.g., the fields in the dataset) (step 960). The chart type and chart properties are determined from the chart definition (step 965). The KPI values are bound to the chart (step 970). The instantiated chart is presented to the user (step 975). After waiting a predetermined time, the engine queries the data sources for updates or new data (this step is optional) (step 980). If there is new data, the process returns to step 955. The chart can be updated by adding data records to the chart or updating old data in the chart with new data. If there is no new data, the process waits for the predetermined time and queries the data sources again.

In one implementation, the chart can be updated when data is pushed from the sources of the data to the engine.

The techniques described herein for forming a chart allow a chart to be created with up-to-date data, rather than created from data that may be outdated by the time a user retrieves the chart for viewing, such as when charts are created from data stored in a spreadsheet. The chart can be updated as required so that a current status of activities within an enterprise can be monitored in real time. Further, simple graphical means are provided for creating the chart that do not require coding on the part of the person adding a chart to a Web page or the person creating a chart definition.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

A number of embodiments of the invention have been described. Nevertheless, it will be understood that various modifications may be made without departing from the spirit and scope of the invention. Accordingly, other embodiments are within the scope of the following claims.

What is claimed is:

1. A method of creating a dynamic chart definition, comprising:

receiving from a user a selection of a data definition, wherein the data definition includes one or more data sources with one or more data fields;

receiving from the user a selection of one or more operators wherein the user selects the one or more operators from a list of graphical representations of operators;

creating a dataset having one or more fields, wherein at least one of the fields of the dataset corresponds to a component of a chart;

receiving from the user input indicating a mapping between one or more of the data fields of the data definition and the one or more operators, and between the one or more operators and a particular field in the dataset, wherein the mapping specifies that the one or more operators perform one or more operations on information in the one or more data fields of the data definition to produce information for the particular field in the dataset, and wherein the mapping is specified graphically by the user using a graphical user interface (GUI) by placing the data definition, the dataset, and the one or more operators onto a canvas and graphically connecting the one or more data fields of the data definition and the one or more operators and graphically connecting the one or more operators and the particular field in the dataset, wherein receiving from the user input indicating a mapping includes receiving user input forming one or more lines from the one or more data fields of the data definition to the one or more operators to the particular field in the dataset;

automatically translating the mapping into code that implements the mapping; and storing the mapping, the code, the data definition, the operators and the dataset as a chart definition;

wherein the method is performed by a computer.

2. The method of claim 1, wherein receiving from the user a selection of one or more operators includes receiving from the user a selection of a GUI component, wherein the GUI component represents SQL code.

3. The method of claim 2, further comprising:

displaying a representation of the data definition, the one or more operators, the dataset and the mapping; and displaying SQL code that corresponds to the mapping.

4. A computer program product for creating a dynamic chart definition, embodied on a machine-readable storage device, that includes executable instructions for causing a computer system to:

receive from a user a selection of a data definition, wherein the data definition includes one or more data sources with one or more data fields;

receive from the user a selection of one or more operators wherein the user selects the one or more operators from a list of graphical representations of operators;

creating a dataset having one or more fields, wherein at least one of the fields of the dataset corresponds to a component of a chart;

receive from the user input indicating a mapping between one or more of the data fields of the data definition and the one or more operators, and between the one or more operators and a particular field in the data set, wherein the mapping specifies that the one or more operators perform one or more operations on information in the one or more data fields of the data definition to produce information for the particular field in the dataset, and wherein the mapping is specified graphically by the user using a graphical user interface (GUI) by placing the data definition, the dataset, and the one or more operators onto a canvas and graphically connecting the one or more data fields of the data definition and the one or more operators and graphically connecting the one or more operators and the particular field in the dataset, wherein the instructions to cause a computer system to receive from the user input indicating a mapping include instructions to cause a computer system to receive user input forming one or more lines from the one or more data fields of the data definition to the one or more operators to the particular field in the dataset;

automatically translate the mapping into code that implements the mapping; and store the mapping, the code, the data definition, the operators and the dataset as a chart definition.

5. The computer program product embodied on a machine-readable storage device of claim 4, wherein the instructions to receive from the user a selection of one or more operators include instructions to receive from the user a selection of a GUI component, wherein the GUI component represents SQL code.

6. The computer program product embodied on a machine-readable storage device of claim 5, further comprising instructions to cause a computer system to:

display a representation of the data definition, the one or more operators, the dataset and the mapping; and display SQL code that corresponds to the mapping.

* * * * *